(12) United States Patent
Friedrichs (10) Patent No.: US 7,275,445 B2
(45) Date of Patent: Oct. 2, 2007

(54) MODULAR PRESSURE SENSOR DRIVE CONNECTABLE TO A COMPUTER

(75) Inventor: Hans Peter Friedrichs, Tucson, AZ (US)

(73) Assignee: Honeywell International, Inc, Morristown, NJ (US)

( * ) Notice: Subject to any disclaimer, the term of this patent is extended or adjusted under 35 U.S.C. 154(b) by 527 days.

(21) Appl. No.: 10/638,997

(22) Filed: Aug. 11, 2003

(65) Prior Publication Data
US 2006/0001992 A1 Jan. 5, 2006

(51) Int. Cl.
*G11B 5/00* (2006.01)
(52) U.S. Cl. .............................. 73/756; 73/753; 330/6
(58) Field of Classification Search ................. 73/753, 73/756
See application file for complete search history.

(56) References Cited

U.S. PATENT DOCUMENTS

| | | | |
|---|---|---|---|
| 4,483,178 A | 11/1984 | Miille | |
| 4,507,707 A | 3/1985 | Willis | |
| 4,838,089 A | 6/1989 | Okada et al. | |
| 4,928,530 A | 5/1990 | Lehto et al. | |
| 5,070,732 A | 12/1991 | Duncan et al. | |
| 5,341,684 A | 8/1994 | Adams et al. | |
| 5,994,707 A | 11/1999 | Mendoza et al. | |
| 6,144,178 A * | 11/2000 | Hirano et al. | ............... 318/476 |
| 6,193,864 B1 | 2/2001 | Leader et al. | |
| 6,484,107 B1 | 11/2002 | Roper et al. | |
| 6,590,777 B2 | 7/2003 | Morino et al. | |

* cited by examiner

*Primary Examiner*—Andre J Allen
(74) *Attorney, Agent, or Firm*—Ingrassia Fisher & Lorenz (57) ABSTRACT

The modular measuring drive system can include a housing having a cavity and being sized and shaped to fit within a disk drive bay of a computer and a measuring device, disposed within the cavity of the housing, for providing a measurement value to the computer. The modular measuring drive system can also include a conduit having a first end, which provides an opening for fluid to pass, and a second end coupled to the measuring device, a data port coupled to the measuring device and configured to be coupled to the computer and a power supply port, coupled to the measuring device, capable of receiving power from a power supply.

13 Claims, 4 Drawing Sheets

MODULAR PRESSURE SENSOR DRIVE CONNECTABLE TO A COMPUTER

BACKGROUND OF THE INVENTION

1. Field of the Invention

The present invention relates generally to high-precision modular measuring instruments, and more particularly to a modular pressure sensor drive connectable to a computer.

2. Description of the Related Art

Many measuring instruments are commercially available to monitor a variety of conditions such as pressure conditions. An example of a high precision absolute pressure sensor is the model 6000 digital pressure standard manufactured by Labersav, Inc. of Houston, Tex. Absolute pressure sensors measure pressure in absolute terms, i.e., as a pressure difference with respect to a vacuum. Relative pressure sensors measure pressure in the form of a pressure difference with respect to a reference pressure. The reference pressure can be an ambient pressure, which may be the atmospheric pressure at the location of use. Other types of measuring instruments may include current and voltage sensors, smoke sensors and temperature sensors.

Measuring instruments are generally comprised of sensing elements combined with support equipment, for example, electronics, processing components, display components and user controls. During the design phase of a measuring instrument, a great deal of time and resources are expended to select, design, configure and integrate hardware and software to ensure that the resulting measuring instrument functions properly. Often, the design process is specific to the measuring instrument being designed, resulting in hardware and software that is not readily reusable. Consequently, updating the measuring instrument to a new design generally requires a complete redesign. Therefore, the conventional approach is neither efficient nor cost effective.

In addition, when measuring accuracy is paramount, the measuring instruments require periodic calibration. The calibration process generally requires the removal of the measuring instrument from duty, thus resulting in an interruption in service. It is therefore advantageous, both for the user on site and for the manufacturer of the measuring instruments, for reasons of calibration, maintenance and portability, to design measuring instruments as a modular assembly. Modular interchangeability of measuring components reduces the manpower associated with removing instruments from service, reduces shipping costs if measuring instruments must be shipped offsite for calibration, and minimizes down time by allowing field-swapping of calibrated sensing elements. Thus, it should be appreciated that there is a need for a modular measuring instrument that overcomes the drawbacks of conventional measuring instruments. The present invention fulfills this need as well as others.

SUMMARY OF THE INVENTION

The present invention relates to a modular pressure sensor drive connectable to a computer. In particular, and by way of example only, one embodiment of the present invention is a modular measuring drive system, which can include a housing having a cavity and being sized and shaped to fit within a standard disk drive bay of a computer and a measuring device, disposed within the cavity of the housing, for providing a measurement value to the computer. The modular measuring drive system can also include a conduit having a first end, which provides an opening for fluid to pass, and a second end coupled to the measuring device, a data port coupled to the measuring device and configured to be coupled to the computer and a power supply port, coupled to the measuring device, capable of receiving power from a power supply.

Another embodiment of the present invention is an autoranging pressure measurement system. The system may include a first measuring drive system including a first disk drive housing, a first pressure sensor positioned adjacent to the first disk drive housing, a first conduit coupled to the first pressure sensor, and a first solenoid valve coupled to the first conduit, a second measuring drive system including a second disk drive housing, a second pressure sensor having a maximum pressure value and positioned adjacent to the second disk drive housing, a second conduit coupled to the second pressure sensor, and a second solenoid valve coupled to the second conduit, the second measuring drive system being daisy chain connected to the first measuring drive system, and a computer for receiving a first pressure value from the first pressure sensor and if the first pressure value is less than the maximum pressure value of the second pressure sensor, then the computer sends a signal to open the second solenoid valve.

Another embodiment of the present invention is a high precision, fault tolerant pressure measurement system. The system may include a first measuring drive system including a first disk drive housing, a first pressure sensor positioned adjacent to the first disk drive housing and a first conduit coupled to the first pressure sensor, a second measuring drive system including a second disk drive housing, a second pressure sensor positioned adjacent to the second disk drive housing and a second conduit coupled to the second pressure sensor, the second measuring drive system being daisy chain connected to the first measuring drive system, a third measuring drive system including a third disk drive housing, a third pressure sensor positioned adjacent to the third disk drive housing and a third conduit coupled to the third pressure sensor, the third measuring drive system being daisy chain connected to the second measuring drive system, and a computer for receiving a first pressure value from the first pressure sensor, a second pressure value from the second pressure sensor and a third pressure value from the third pressure sensor, and for comparing the first, second and third pressure values to determine if any of the pressure sensors is providing an inaccurate pressure value.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the present invention will now be described with reference to the drawings. The drawings and the associated descriptions are provided to illustrate embodiments of the present invention and not to limit the scope of the present invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necassarily all referring to the same embodiment. Throughout the drawings, reference numbers are re-used to indicate correspondence between referenced elements. In addition, the first digit of each reference number indicates the figure in which the element first appears.

Figure 1:
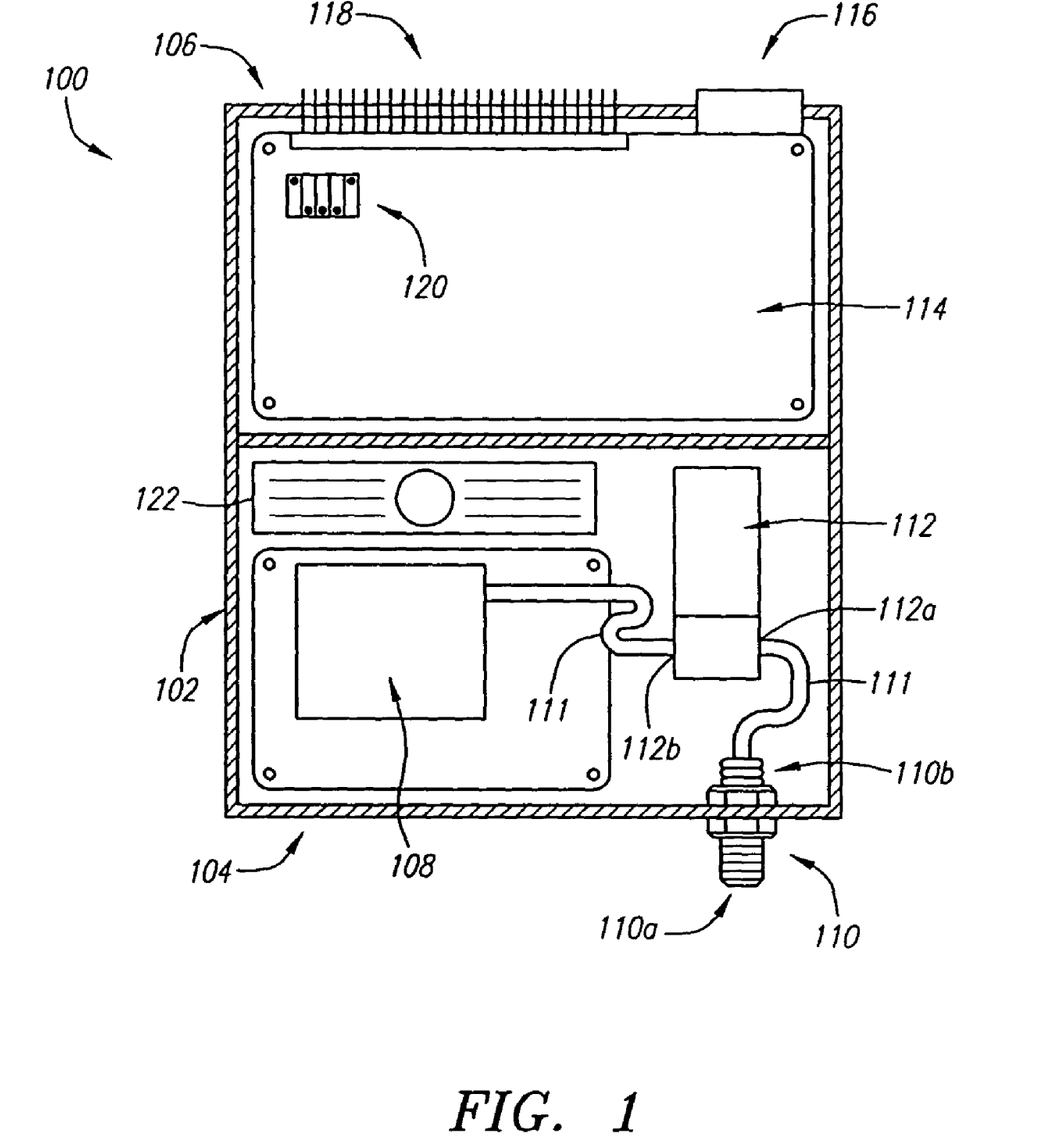
FIG. 1 is a top plan view of a measuring drive system in accordance with a referred embodiment of the present invention.

Referring now more particularly to the drawings, FIG. 1 is a top plan view of a measuring drive system 100 (e.g., a sensor drive system). The measuring drive system 100 is a modular apparatus that can be connected to or used with commercially available electronic devices such as computers, processors, power supplies, keyboards, monitors, laboratory equipment and bench top instruments or any other device. The electronic devices can provide the user with an interface to communicate with, control and program the measuring drive system 100. One application of the measuring drive system 100 is to provide a platform to package a measuring device or instrument within the measuring drive system 100 for modular connection to a computer. For example, the measuring drive system 100 can be designed to fit within a disk drive bay of a computer. The measuring drive system 100 can also be easily inserted into and removed from the disk drive bay of the computer. In one embodiment, the measuring drive system 100 can be configured to function as a single channel pressure measuring instrument connectable to a computer, which is capable of running a software program to control the instrument.

The measuring drive system 100 can include various components or elements such as a housing 102 having a front face 104 and a rear face 106, a measuring device 108, an input port 110, a conduit 111, a solenoid valve 112, an interface circuit or circuit board 114, a power connector 116, a data port 118, an address unit 120 and a resistive heater 122. The housing 102 can be constructed of an aluminum, plastic or other suitable material and can be designed (e.g., shaped, sized, drilled and tapped) to match the footprint of an industry-standard (e.g., half-height) disk drive casing for a computer. That is, the housing 102 can fit into a disk drive bay of a conventional computer or server system. The housing 102 generally includes four sides, which form a cavity 124 that can hold the measuring device 108, the conduit 111, the solenoid valve 112, the interface circuit 114, the address unit 120 and the resistive heater 122. The standard disk drive casing advantageously allows the measuring drive system 100 to be modular. For example, the measuring drive system 100 can be easily removed and installed in the disk drive bay of a conventional computer chassis allowing for rapid design of "n" channel measuring systems. In addition, the components or elements of the measuring drive system 100 can be removed, calibrated or replaced, and reinstalled with relative ease. For example, the measuring drive system 100 can be removed periodically for the routine calibration of the measuring device 108 without having to remove or dismantle the computer system hosting the measuring device 108. In addition, if spare measuring devices 108 are available in inventory, the replacement measuring device 108 can be reinstalled at that time, reducing downtime from days or hours to minutes. In one embodiment, the front face 104 of the housing 102 can be visible to an individual when the measuring drive system 100 is installed in a conventional computer case.

The measuring device 108 can be a pressure, voltage, current, capacitance, flow, smoke or temperature sensor or any other type of sensor. For example, the pressure sensor can be an absolute or gauge pressure sensor or a differential or reference pressure sensor. In one embodiment, the measuring device 108 is a quartz digital pressure sensor, part number 4201652-6 manufactured by Honeywell International, Incorporated. The type of measuring device 108 implemented will determine the permissible range of the reading, which can vary over a large range of values. For example, if a pressure sensor is used, the pressure sensor can be configured to provide readings over a specified range, for example, up to 100 inches of mercury, 64 inches of mercury or 40 inches of mercury.

The input port 110 can have a first end 110a that has a threaded input fitting that can be connected to, for example, a pressure source (not shown) or a vacuum source (not shown) and at a second end 110b that can be connected to the conduit 111, e.g., a hose, which is connected to the measuring device 108. The pressure source can be a regulated nitrogen cylinder or a clean compressed air pressure source as commonly available in commercial industrial settings. The vacuum source can be a venturi, vane or wobble type vacuum pump such as model number 2580, manufactured by Welch Vacuum of Skokie, Ill. For illustrative purposes, the input port 110 is shown in FIG. 1 to be protruding through the front face 104 of the housing 102, however, in another embodiment, the input port 110 can protrude through the rear face 106 of the housing 102 between the power connector 116 and the data port 118. When the measuring device 108 is a differential pressure sensor, two input ports 110 can be implemented and can be separately connected to the measuring device 108 for taking a reading from a first input port and a second input port to determine the differential pressure.

The isolation or solenoid valve 112 can have a first port 112a coupled to the input port 110 and a second port 112b coupled to the measuring device 108. When the solenoid valve 112 is closed, the measuring device 108 is sealed off and isolated from the input port 110. The solenoid valve 112 is capable of providing a solid seal in either direction so that a positive or negative delta pressure can be maintained across the solenoid valve 112. In addition, the solenoid valve 112 is designed to not produce a significant amount of heat because any warming of the air trapped within the isolated portion of the solenoid valve 112 may cause the air to expand, yielding a false indication or reading to the measuring device 108. In one embodiment, the solenoid valve 112 can be a pneumatically operated spool valve having an equivalent internal bore of about 6.35 millimeters (0.25 inches). For example, the solenoid valve 112 can be a spool valve, model number 250A DAP, manufactured by Humphrey Products of Calamazoo, Mich. When the solenoid valve 112 is open, the internal bore poses negligible resistance to the flow of gas, such air or dry nitrogen, through the solenoid valve 112 to the measuring device 108. Alternatively, the solenoid valve 112 can be an electrically operated valve controlled by a computer, which can run a software routine to open and close the solenoid valve 112. In addition, the software routine can provide auto ranging of the measuring device 108.

The interface circuit 114 can be positioned within the cavity 124 of the housing 102 and can be coupled to the measuring device 108, the solenoid valve 112, the power connector 116, the data port 118, the address unit 120 and the resistive heater 122. The interface circuit 114 can be used as an interface to the computer. In particular, the interface circuit 114 can provide the connections to allow the computer to send and receive signals to and from the measuring device 108, the solenoid valve 112, the power connector 116, the data port 118, the address unit 120 and the resistive heater 122. Also, the interface circuit 114 can function as a power conditioner by receiving 12 volt power from an external power supply via the power connector 116 and converting the 12 volt power to other voltages suitable for use by the components or elements of the measuring drive system 100. The power connector 116 can be a standard 4-pin Molex connector, which allows the interface circuit 114 to receive power from a standard computer power supply. The interface circuit 114 and the power connector 116 allow the measuring drive system 100 to emulate an actual disk drive. The emulation may take the form of a small computer system interface (SCSI), integrated drive electronics (IDE) or other standard communications interfaces.

The data port 118 can include a double row of header pins (e.g., 16 pins), which are configured to mate with a standard cable such as an internal drive cable (IDC), a SCSI cable, a universal serial bus (USB) cable and a ribbon cable. The data port 118 can be connected to the measuring device 108 or the interface circuit 114 and the standard cable can be used to connect the data port 118 to the computer. The address unit 120 can include a number of switches to allow a device number or a drive identification number to be set for the measuring device 108 to enable it to be uniquely identified when used in a system (e.g., the multi-channel system 200 described below) that includes more than one measuring device 108. The resistive heater 122 can be thermally coupled to the measuring device 108 and can be cycled on and off by the computer so that the measuring device 108 maintains a substantially constant operating temperature, which enhances the stability and accuracy of the measuring device 108.

Figure 2:
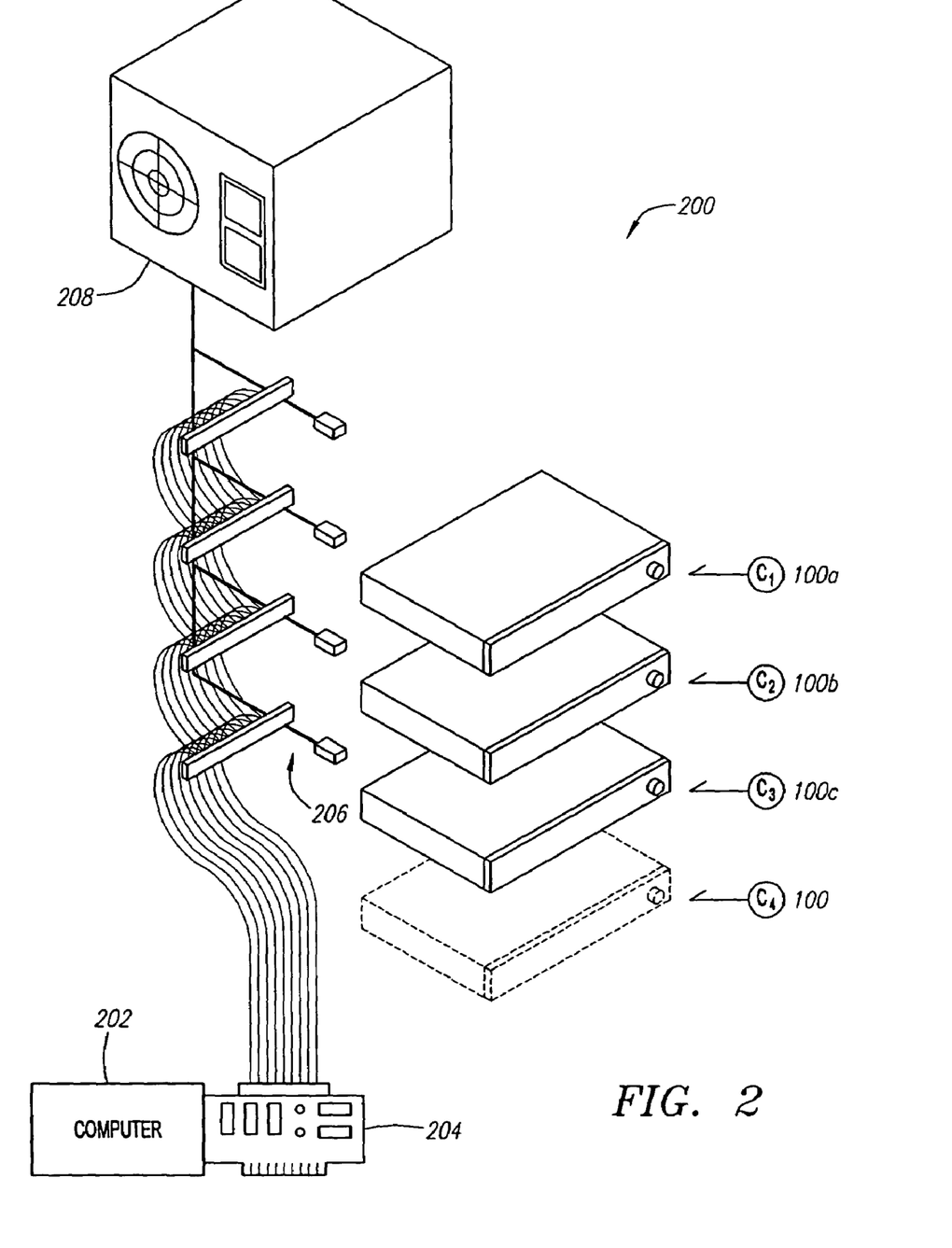
FIG. 2 is a perspective view of a multi-channel system having a number of measuring drive systems cascaded or daisy chained together to connect to a computer system in accordance with a preferred embodiment of the present invention.

FIG. 2 is a perspective view of a multi-channel system 200 having a number of measuring drive systems 100 cascaded or daisy chained together to connect to a computer system 202. The computer system 202 is typically a standard personal computer. A multi-channel system is created when multiple measuring drive systems 100 (e.g., sensor drives) are connected to the computer system 202. The computer system 202 can communicate with the measuring drive systems 100 using a RS-232, RS-422, TCPIP, IEEE-488, USB or any other protocol. The computer system 202 can also remotely communicate with the measuring drive systems 100 using a wireless link.

The multi-channel system 200 can also include an interface card 204 that is connected to the computer system 202. The interface card 204 can be a standard digital input-output (I/O) card, for example, model number CIO-DIO48, manufactured by Measurement Computing of Middleboro, Mass. The digital I/O card can include a parallel port I/O device, which allows the computer system 202 to transmit on/off state signals to the various components (e.g., the measuring device 108, the solenoid valve 112, the circuit or circuit board 114, the data port 118, the address unit 120 and the resistive heater 122) of the multi-channel system 200. The digital I/O card can read (receive as an input) and set and reset (transmit as an output) bits under the control of the computer system 202. As shown in FIG. 2, multiple measuring drive systems 100 are daisy chained together using a cable 206 (e.g., a ribbon cable), which is connected at one end to the interface card 204.

The multi-channel system 200 can also include a power supply 208, which can be part of the computer system 202 or a separate stand-alone device as shown in FIG. 2. The power supply 208 is connected to the power connector 116 of each measuring drive system 100. In one embodiment, the interface card 204, the cable 206 and the power supply 208 are positioned within a chassis of the computer system 202. The number n (where n is an integer) of measuring drive systems 100 that are part of the multi-channel system 200 may depend on the number of drive bays in the computer system 202 and the number of available power outlets on the power supply 208. In one embodiment, multiple measuring drive systems 100 can be housed within the chassis of the computer system 202 or a server system.

Figure 3:
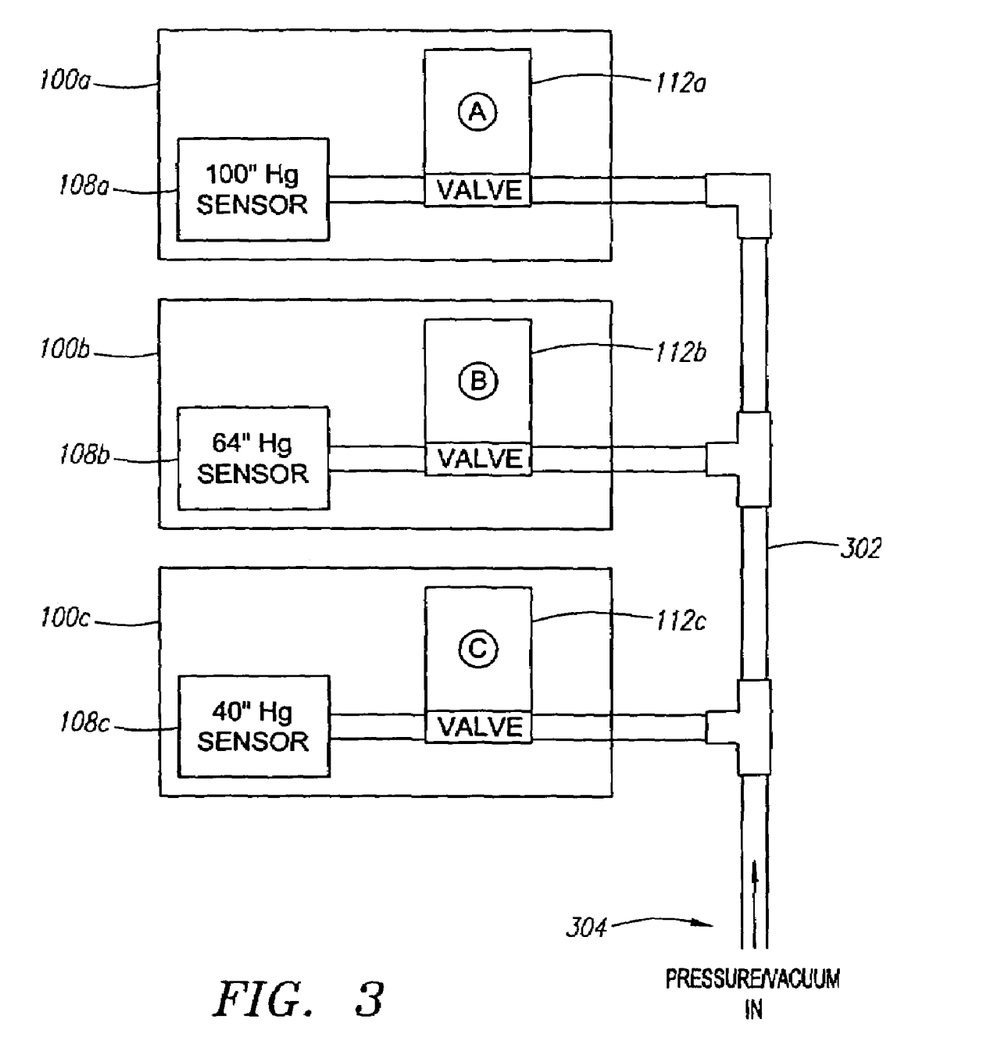
FIG. 3 shows a simplified block diagram of an autoranging measurement system that utilizes three measuring drive systems cascaded together in accordance with a preferred embodiment of the present invention.

FIG. 3 shows a simplified block diagram of an auto-ranging measurement system 300 that utilizes three measuring drive systems 100 that are coupled together via their respective input port 110 using a connector conduit 302 (e.g., a manifold or tube). That is, the connector conduit 302 can be used to connect each of the input ports 110 together. Each of the measuring drive systems 100 are connected to the computer system 202 using their respective data port 118. The auto-ranging measurement system 300 includes an input port 304 for providing an avenue to measure a particular condition. The input port 304 is a common input for the three measuring drive systems 100a, 100b, 100c, which can be mounted in a conventional PC chassis. The measuring drive systems 100 are daisy chained to a common controller (not shown). Each measuring drive system 100 has a solenoid valve 112 for allowing the respective measuring device 108 to isolate itself from the common input port 304.

The measuring devices 108 can have different accuracy and sensitivity ranges. That is, each measuring drive system 100 includes a measuring device 108 configured to measure a different range of pressures. For example, if the three measuring devices 108 are pressure sensors, the first, second and third pressure sensors 108a, 108b, 108c can measure pressure up to about 100, 64 and 40 inches of mercury, respectively. The computer system 202 controls the opening and closing of the solenoid valve 112 to select which measuring drive system 100 is connected to the input port 304. In one embodiment, all of the solenoid valves 112 are initially closed. Thereafter, if a pressure is applied to the input port 304, the computer system 202 will first open the solenoid value 112 corresponding to the measuring device 108 with the largest range and will then assess the order of magnitude of the reading (e.g., pressure reading) received from the measuring device 108 to determine if another measuring device 108 can take a more accurate reading. For example, the computer system 202 may first open the first solenoid valve 112a to allow for measurement by the first pressure sensor 108a. Thereafter, the computer system 202 will receive the pressure measurement from the first pressure sensor 108a via the data port 118. Using the pressure measurement, the computer system 202 can ascertain the relative magnitude of the pressure applied to the input port 304. Using the relative magnitude, the computer system 202 will select the measuring device 108 most suited to make an accurate measurement for that pressure reading. For example, if the first pressure sensor 108a reads the pressure to be 35 inches of mercury, then the computer system 202 will open the third solenoid valve 112c to allow for a more accurate pressure measurement using the third pressure sensor 108c. The third pressure sensor 108c may read the pressure to be 34.4 inches of mercury. Hence, the computer system 202 can be configured to receive a measurement from one or more measuring devices 108 and control their respective solenoid valve 112 in response to the pressure applied at the input port 304.

The auto-ranging measurement system 300 allows for a much greater range of measurement and a more accurate measurement. In addition, the auto-ranging measurement system 300 protects lower range pressure sensors (e.g., pressure sensor 108c) from over pressure conditions while making the lower range pressure sensors available for high accuracy measurements of low pressures. For any applied pressure to the input port 304, the computer system 202 can automatically select the most appropriate pressure sensor 108 to take the pressure reading. In one embodiment, if the measured pressure is greater than or equal to the sensitivity of the pressure sensor 108, the computer system 202 will not open the solenoid valve 112, thus protecting the pressure sensor 108 from receiving excessive pressure.

Figure 4:
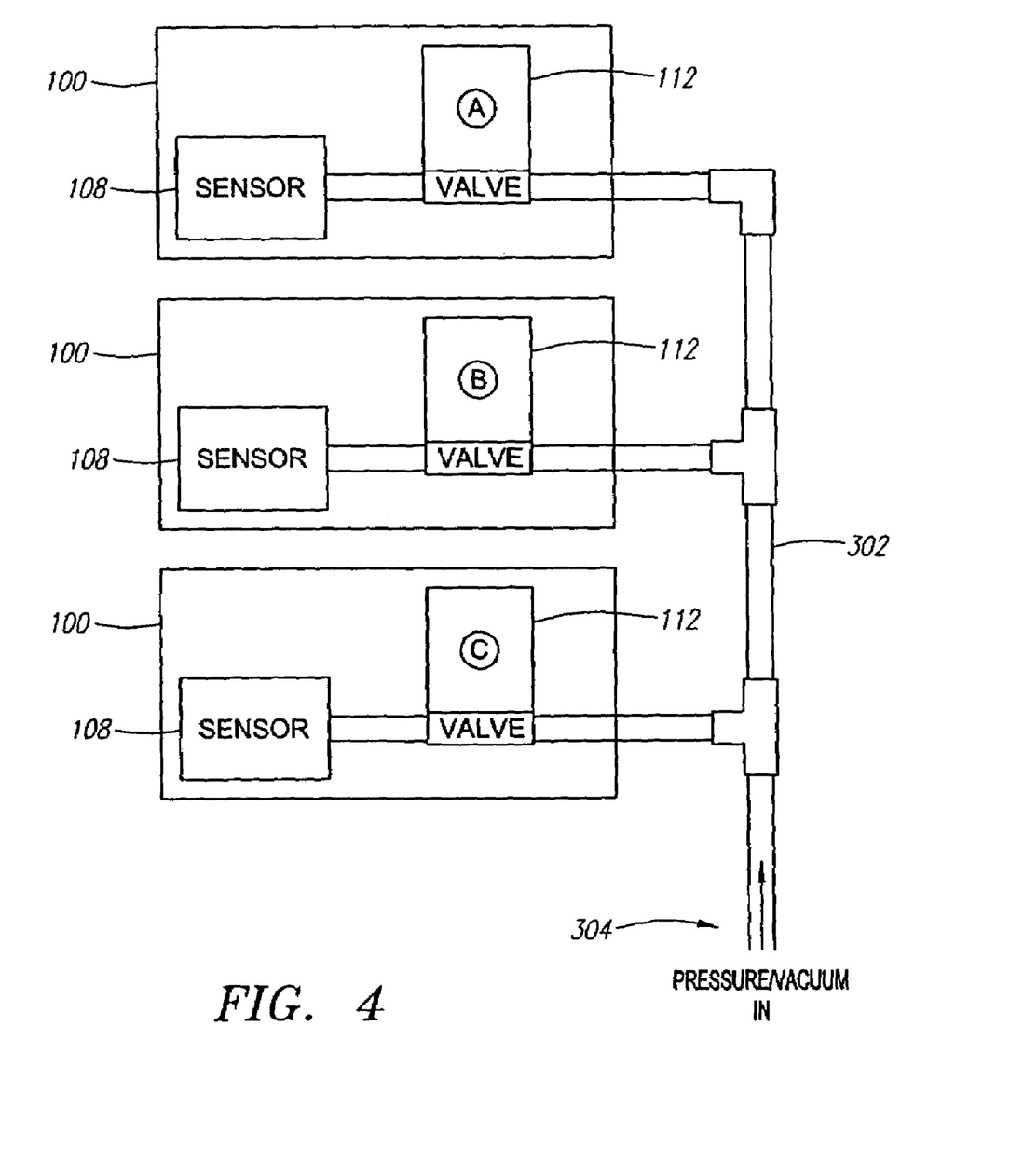
FIG. 4 shows a simplified block diagram of a high precision, fault tolerant system that utilizes three identical measuring drive systems that are coupled together via their respective input port using the connector conduit in accordance with a preferred embodiment of the present invention.

FIG. 4 shows a simplified block diagram of a high precision, fault tolerant system 400 that utilizes three identical measuring drive systems 100 that are coupled together via their respective input port 110 using the connector conduit 302. That is, the connector conduit 302 can be used to connect each of the input ports 110 together. The measuring drive systems 100 can be mounted in a conventional PC chassis. The measuring drive systems 100 can include identical measuring drive systems 100, which include measuring devices 108 that have the same or similar measuring range. Using identical measuring drive systems 100 provide for fault tolerance and greater accuracy. Each of the measuring drive systems 100 are connected to the computer system 202 using their respective data port 118. The high precision, fault tolerant system 400 includes the input port 304 for providing an avenue to measure a particular condition.

In one embodiment, the computer system 202 opens all the solenoid valves 112 and commands the measuring devices 108 to measure the manifold pressure. The computer system 202 compares each of the measured values received from the measuring devices 108 and selects or calculates a value to reduce measurement noise, improve accuracy, and if necessary, isolate one or more measuring devices 108 that appear to be malfunctioning. For example, if one or more of the measuring devices 108 is damaged or drifts unacceptably out of calibration, the computer system 202 can remove it from further consideration by closing its solenoid valve 112. The computer system 202 can calculate a resulting value by summing, averaging, root-mean-squaring the measured values or performing other mathematical operations for improving the signal-to-noise ratio and the overall system accuracy. Thus, the computer system 202 can tolerate partial failure of the measuring drive systems 100 and provide a warning before an entire system failure occurs, all without an interruption in service. For example, the computer system 202 can set a warning flag that notifies the user that one or more measuring devices 108 are not functioning correctly, while still providing uninterrupted operation.

For varying degrees of precision and redundancy, fewer or greater than three measuring drive systems 100 can be implemented. Providing redundant measuring drive systems 100 allows the high precision, fault tolerant system 400 to reinforce the accuracy of the data, owing to the fact that data is additive and reinforced, while measurement noise is essentially random and may tend to cancel itself. Hence, the signal-to-noise ratio of a number of measuring devices 108 is better than the signal-to-noise ratio of a single measuring device 108.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A modular measuring drive system, comprising:
a housing having a cavity, a footprint of a disk drive casing, and configured to fit within a disk drive bay of a computer;
a measuring device, disposed within the cavity of the housing, for providing a measurement value to the computer; a conduit having a first end, which provides an opening for fluid to pass, and a second end coupled to the measuring device;
a data port coupled to the measuring device and configured to be coupled to the computer; and
a power supply port, coupled to the measuring device, capable of receiving power from a power supply.

2. The system as defined in claim 1, wherein:
the measuring device is selected from a group consisting of a pressure sensor, a voltage sensor, a current sensor, a capacitance sensor, a flow sensor, a smoke sensor and a temperature sensor.

3. The system as defined in claim 1, further comprising a solenoid valve positioned along a path of the conduit and configured to open and close based on a signal received from the computer.

4. The system as defined in claim 1, further comprising a circuit for providing an interface between the measuring device and the computer.

5. The system as defined in claim 4, fbrther comprising an address unit, coupled to the circuit, for uniquely identifying the measuring device.

6. The system as defined in claim 5, wherein the address unit includes a plurality of switches to set a unique identification code for the measuring device.

7. The system as defined in claim 1, further comprising an electrical conduit to connect the measuring device to the computer.

8. The system as defined in claim 1, further comprising a heater, positioned adjacent to the measuring device, for regulating the temperature of the measuring device by being turned on and turned off using a command received from the computer.

9. The system as defined in claim 1, further comprising a heater, positioned adjacent to the measuring device, for providing a substantially constant operating temperature for the measuring device by being turned on and turned off using a command received from the computer.

10. The system as defined claim 1, wherein the data port is configured to connect to an internal drive cable, a small computer system interface cable, a universal serial bus cable or a ribbon cable.

11. The system as defined in claim 1, further comprising a second measuring device daisy chain connected to the measuring device.

12. The system as defined in claim 1, further comprising a digital input-output card configured to be connected to the computer to provide an interface between the data port and the computer.

13. The system as defined in claim 12, wherein the computer sets and resets a plurality of bits using the digital input-output card.

* * * * *

UNITED STATES PATENT AND TRADEMARK OFFICE
CERTIFICATE OF CORRECTION

PATENT NO. : 7,275,445 B2 Page 1 of 1
APPLICATION NO. : 10/638997
DATED : October 2, 2007
INVENTOR(S) : Hans Peter Friedrichs It is certified that error appears in the above-identified patent and that said Letters Patent is hereby corrected as shown below:

Column 8, line 51, "fbrther" should be changed to --further--.

Signed and Sealed this

Twenty-fourth Day of June, 2008

JON W. DUDAS
*Director of the United States Patent and Trademark Office*